United States Patent
Tufano

(10) Patent No.: US 8,891,126 B2
(45) Date of Patent: Nov. 18, 2014

(54) SYSTEMS AND METHOD FOR ROLL BASED LABEL PRINTING

(71) Applicant: Just One Label, LLC, Chandler, AZ (US)

(72) Inventor: Jeffery William Tufano, Chandler, AZ (US)

(73) Assignee: Just One Label, LLC, Chandler, AZ (US)

( * ) Notice: Subject to any disclaimer, the term of this patent is extended or adjusted under 35 U.S.C. 154(b) by 0 days.

(21) Appl. No.: 13/797,750

(22) Filed: Mar. 12, 2013

(65) Prior Publication Data

US 2014/0153004 A1    Jun. 5, 2014

Related U.S. Application Data

(60) Provisional application No. 61/732,121, filed on Nov. 30, 2012.

(51) Int. Cl.
    *G06K 15/02*    (2006.01)
    *G06F 3/12*    (2006.01)

(52) U.S. Cl.
    CPC ............ *G06F 3/1262* (2013.01); *G06F 3/1205* (2013.01); *G06F 3/1219* (2013.01); *G06F 3/1251* (2013.01); *G06F 3/1285* (2013.01)

USPC .......... 358/1.2; 358/1.15; 358/1.18; 715/243; 101/485; 283/81

(58) Field of Classification Search
    CPC ........ B41J 3/4075; B41J 11/46; B41J 15/042; B41J 11/66; G06K 19/07718; G06K 19/0776; G09F 3/0286; B31D 1/021; B65C 2009/0018; B65C 2210/007
    USPC .......... 358/1.15, 1.2, 1.18; 715/243; 101/485; 283/81
    See application file for complete search history.

(56) References Cited

U.S. PATENT DOCUMENTS

7,009,723 B1 *   3/2006   Bartholet et al. ............ 358/1.15

\* cited by examiner

*Primary Examiner* — Jacky X Zheng
(74) *Attorney, Agent, or Firm* — Snell & Wilmer L.L.P.

(57) ABSTRACT

A method is provided for laying out labels and other printable items in a gang of print jobs that comprises a first print job and a second print job; laying out the first type of labels consecutively in a first lane, from a start point until one of (a) the end of the first lane is reached and (b) the end of the number of labels is reached for the first type; continuing laying out the first type of labels consecutively in a second lane if the end of the number of labels for the first type is not reached in the first lane; and laying out labels consecutively of the second type starting at the end point of the labels of the first type; and printing the gang of labels according to the layout for the gang of label print jobs. Efficient label printing is enabled.

4 Claims, 14 Drawing Sheets

SYSTEMS AND METHOD FOR ROLL BASED LABEL PRINTING

CROSS-REFERENCE TO RELATED APPLICATION

This application claims priority to U.S. Provisional Application No. 61/732,121, entitled "Systems and Methods for Roll Based Printing," which was filed on Nov. 30, 2012, the contents of which are hereby incorporated by reference for any purpose in their entirety.

FIELD OF THE INVENTION

The present invention generally relates to organizing, laying out, and printing labels and similar print jobs.

BACKGROUND OF THE INVENTION

Printing using "ROLL" or "WEB" based printing presses, typically involves the unwinding of a roll of printable material on the input side of a printing press and the rewinding of the printed material on the output side of the press. Modern printing presses use many methods of printing. Digital printing presses, for example, may use one or more cylinders with each cylinder representing a color, one or more toner cartridges with each cartridge representing a color, one or more ink cartridges with each ink cartridge representing a color or any other method of applying one or more colors to the printable material. These presses may apply the colors to the printable material at one time or one color at a time. For example, most print jobs run as four color or "PROCESS COLOR" print jobs using "CMYK" (Cyan, Magenta, Yellow, and Black) colors. Each cylinder, traditionally is wrapped with a "plate" that represents a single color of the art work. These plates, when merged and unwrapped represent a single frame. The frame dimension is usually decided based on the most number of labels that can fit on the cylinder.

With the advent of digital printing these plates or cylinders can take different forms. For example some digital presses use a laser to write an image to a cylinder and that cylinder creates a temporary image that picks up one to many colors and transfers them onto the printed material. Other examples are similar to a photo copier or a laser printer or an inkjet printer, and in these examples the material (as it passes by the writing heads) receives the individual colors as toner, or ink, or any similar method of transferring individual colors to the material.

In one example, and with reference to FIG. 1, a cylinder 110 may be configured, i.e., wrapped, with a "plate" that prints one frame 120 of labels 130. The length of the cylinder is known as the "web," or "across the web." Thus, the width 140 of frame 120 may be about the same as the web or length of the cylinder. The direction around the cylinder is known as "with the web." Thus, the length 150 of frame 120 may be about the same length as the circumference around cylinder 110.

By way of example, a label 130 may be 1.875 inches high and 4.5 inches wide, and a frame may have a width 140 of 11.625 inches and a length 150 of 17 inches. Accounting for space between the labels, in this example, the maximum labels across the width may be five and the maximum labels along the length of the frame may be three. Thus, in this example, a maximum of fifteen labels may be printed per frame. Thus, in this embodiment, label orders may be in multiples of 15. In the event that an order requests 1 to 14 labels less than an even multiple of 15, there will be wasted labels.

Moreover, typically, all of the labels in one frame are similar to each other (size and artwork). In a further example, and with reference to FIG. 2, a print house may receive an order for five different types of labels that are the same size, but each with different artwork. The order may be for 1000 labels of type 1, 1100 labels of type 2, 1200 labels of type 3, 1250 labels of type 4, and 1300 labels of type 5. Typically a separate plate is created for each type of label, and each frame printed will contain the art for one type of label. On a large roll of label printable material, the print jobs for these five types may then be run sequentially—printing type 1, then type 2, and so forth until all five types have been printed.

Assuming that for all five label types, fifteen labels can be printed per frame, when printed in this manner, it is noted that it takes 67 frames to print 1005 labels to fill the order for type 1 labels. This is an overage of five labels. Similarly, 74 frames prints 1110 labels (10 over), 80 frames to print 1200 labels (exact), 84 frames to print 1260 labels (10 over), and 87 frames to print 1305 labels (five over). Printed in this manner, the total print job comprises 392 frames and results in filling the order with thirty extra (or wasted) labels. It is fairly common for print houses to charge their clients as much as 10% overage for such wasted labels. This is undesirable.

Disclosed herein are systems and methods for printing labels more efficiently, with greater flexibility, less expensively, and with the ability to provide further information than is currently possible.

SUMMARY OF THE INVENTION

A method is provided for organizing and causing the printing of labels in digital, lane based label printing on a label printer configured to print more than one lane across at least a portion of a roll of printable material. The lanes are in the direction of the unrolling of the printable material. The printing involves more than one column of labels, the columns being in the direction perpendicular to the lanes. In an example embodiment, the method comprises identifying a first label print job and a second label print job, wherein the first label print job differs from the second label print job by at least one of the following differences: different customers, different purchase orders, different line numbers, different label graphics, and different label text. The method also comprises forming a gang of label print jobs comprising the first and second label print jobs and laying out the gang of label print jobs for subsequent printing on the roll of printable material in a printer. The laying out the gang of label print jobs may further comprise: laying out labels from the first label print job successively within a lane of said at least two lanes and starting in a first lane of the at least two lanes, wherein the laying out of labels from the first label print job continues in a second lane of the at least two lanes if: (a) the first lane is full, and (b) all labels from the first label print job have not yet been laid out; and laying out labels from the second label print job successively within a lane of said at least two lanes and starting following the first label print job. The method may further comprise providing the layout of the gang of label print jobs to a printer; and printing the gang of label print jobs based on the layout.

In various embodiments, informational label are included with the gang of label print jobs. In other embodiments, the various systems and methods facilitate label customers to obtain economies of scale to which their smaller orders would otherwise not entitle them to obtain.

Moreover, although discussed herein in terms of labels, the disclosure encompasses any digital roll based printing of printable items where more than one lane is used across the web of the roll to print the printable items.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

While exemplary embodiments are described herein in sufficient detail to enable those skilled in the art to practice the invention, it should be understood that other embodiments may be realized and that logical changes may be made without departing from the spirit and scope of the invention. Thus, the following detailed description is presented for purposes of illustration only.

Figure 1:
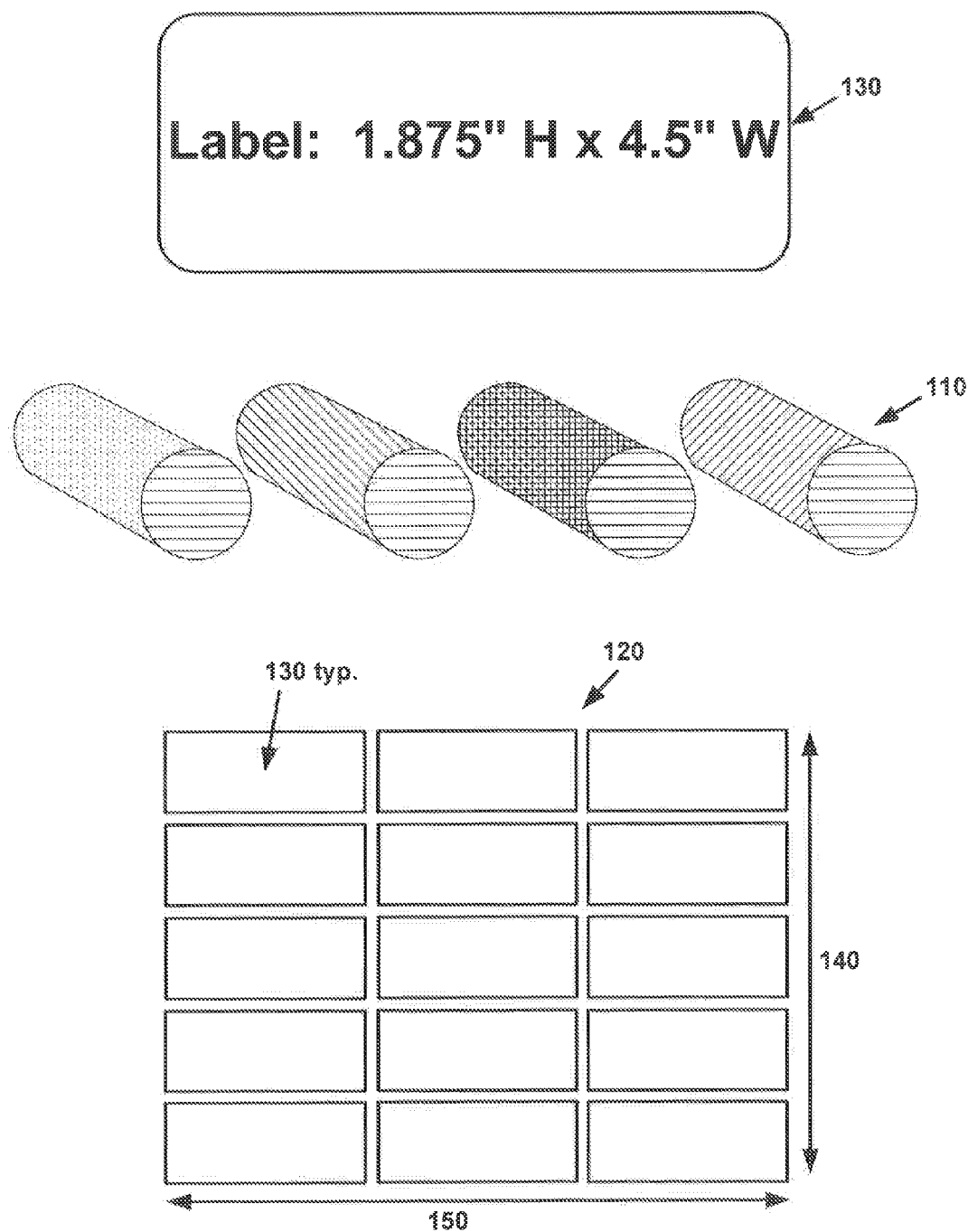
FIG. 1 is an example schematic diagram illustrating the layout of a frame of labels of the same type.
Figure 2:
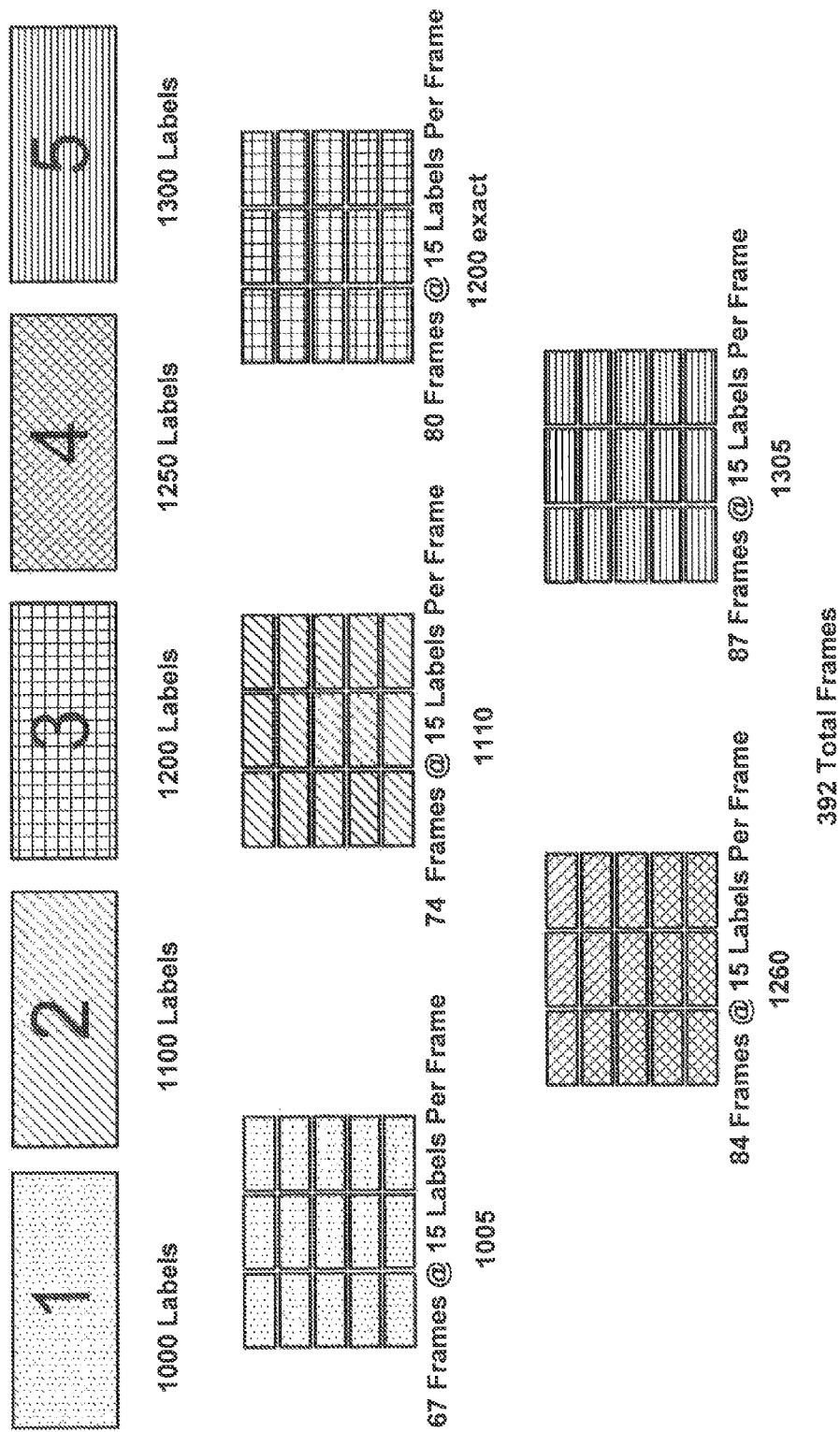
FIG. 2 is an example schematic diagram illustrating the layout of five print jobs using a frame by frame method of printing.
Figure 3:
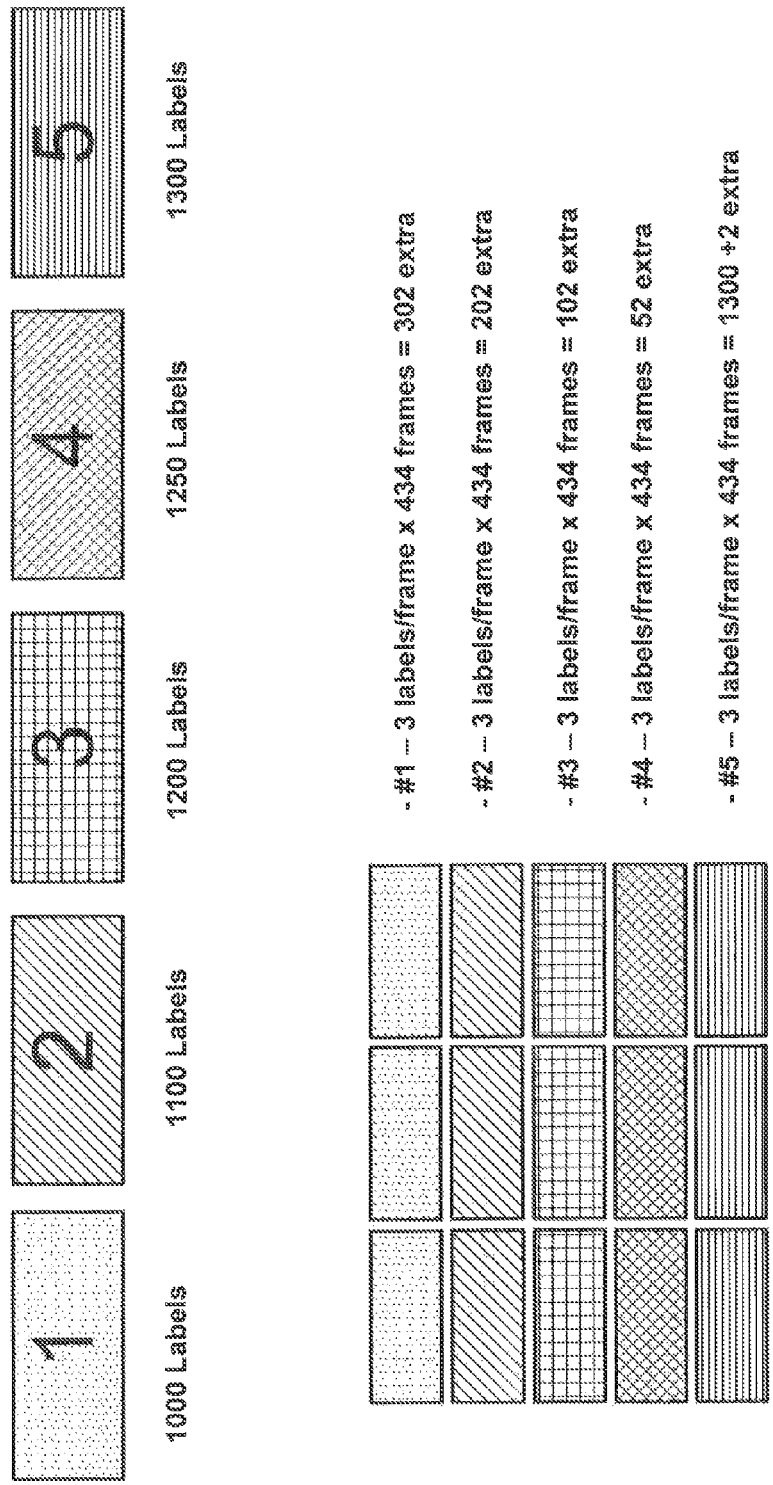
FIG. 3 is an example schematic diagram illustrating the layout of five print jobs using a side by side method of printing.

More recently, some print houses have "all digital" printing, and do not have to manufacture the expensive plates that are wrapped around the cylinders. Each frame can now contain multiple art files. For example, and with reference to FIG. 3, a print house may lay out the five print jobs described in the example above by running them side by side across the web of the frame. In this example, three labels of each type are printed on each frame. In this manner, it takes 434 frames times three labels to print 1302 labels to meet the requested 1300 labels of type 5. Unfortunately, printing in this manner results in printing far more labels than requested of the other types. Type 1 would have 302 extra, type 2 would have 202 extra, type 3 would have 102 extra, type 4 would have 52 extra, and type 5 would have 2 extra. That is a total of 660 labels that would have to be scrapped. Therefore, this method has not been desirable over the traditional method of printing a single frame with all the same type of labels. Disclosed herein are systems and methods for printing labels and other print jobs more efficiently, with greater flexibility, less expensively, and with the ability to provide further information than is currently possible.

Figure 4:
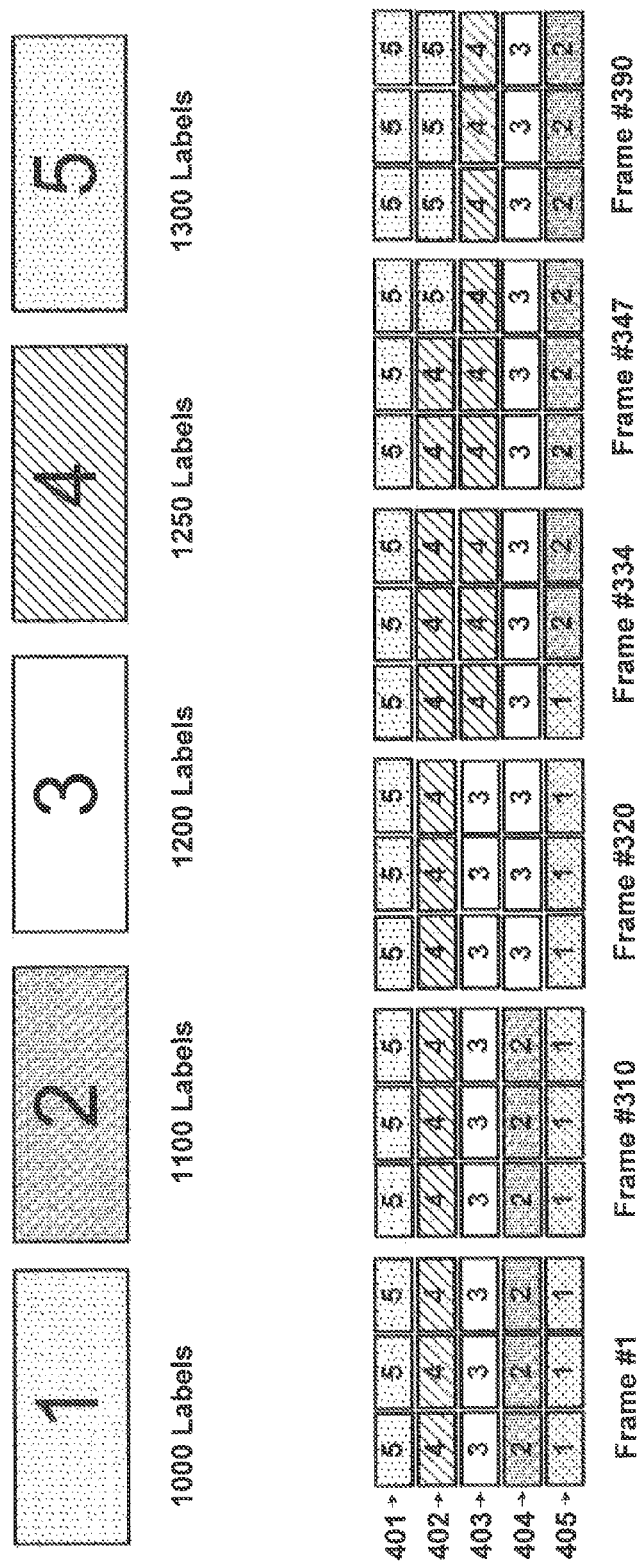
FIG. 4 is an example schematic diagram illustrating the printing of five print jobs in accordance with an example embodiment.

With reference now to FIG. 4, and in accordance with an example embodiment, an efficient system and method for printing print jobs is now described. In one example embodiment, and with reference to the requested five print jobs described above, a print house may receive requests for five different types of labels. The labels may be of the same size, but each type of label may comprise different artwork and a different quantity of labels. For example, the requests may include 1000 labels of type 1, 1100 labels of type 2, 1200 labels of type 3, 1250 labels of type 4, and 1300 labels of type 5. In an example embodiment, the labels are laid out in the print jobs to minimize the excess labels.

In an example embodiment, the total number of labels is calculated (here 5,850 labels). Assuming as before that the total number of labels per frame is 15, then 390 frames may accommodate the total number of labels for the five print jobs. In this example embodiment, the 1300 labels of type 5 are laid out starting in a first lane 401, filling the entire first lane and wrapping back into a second lane 402. Thus, 1170 labels of type 5 are laid out in first lane 401 and 130 labels of type 5 are laid out in the second lane 402. The labels of type 5 transition to the labels of type 4 in frame number 347 of second lane 402. In other words, the labels of type 4 are laid out starting in second lane 402 (i.e., continuing) where the labels of type 5 ended.

The labels of type 4 may fill the remainder of second lane 402, and wrap around into third lane 403. Thus, 1040 labels of type 4 may be laid out in second lane 402 and 210 labels of type 4 may be laid out in third lane 403. The labels of type 4 transition to the labels of type 3 between frame numbers 320 and 321 of third lane 403. In other words, the labels of type 3 are laid out starting in third lane 403 (i.e., continuing) where the labels of type 4 ended.

The labels of type 3 may fill the remainder of third lane 403, and wrap around into fourth lane 404. Thus, 960 labels of type 3 may be laid out in third lane 403 and 240 labels of type 3 may be laid out in fourth lane 404. The labels of type 3 transition to the labels of type 2 between frame numbers 310 and 311 of fourth lane 404. In other words, the labels of type 2 are laid out starting in fourth lane 404 (i.e., continuing) where the labels of type 3 ended.

The labels of type 2 may fill the remainder of fourth lane 404, and wrap around into fifth lane 405. Thus, 930 labels of type 2 may be laid out in fourth lane 404 and 170 labels of type 2 may be laid out in fifth lane 405. The labels of type 2 transition to the labels of type 1 in frame number 334 of fifth lane 405. In other words, the labels of type 1 are laid out starting in fifth lane 405 (i.e., continuing) where the labels of type 2 ended. The labels of type 1 may fill the remainder of fifth lane 405. Thus, 1000 labels of type 1 may be laid out in fifth lane 405.

Thus, in this example embodiment, there are minimal to no wasted labels associated with this print run based on even or odd label quantity requests. Although described above with very specific quantities of labels and numbers of different label types, the principles may be applied more generally. More generally, in accordance with various example embodiments, a method of printing is described herein. Although described in various portions of this disclosure in terms of "printing labels," it is noted that the principles discussed herein are equally applicable to other print jobs. For example, the same techniques may be used for printing stickers, children's stickers, name-tags, decals, business cards, flyers, brochures, name tags, stamps, seals, address labels, shelf talkers, price tags, bumper stickers, window decals, magnets, or anything else that can be printed and delivered in a roll format. Stated generically, the print job may comprise a unique graphic that is printed multiple times to form individual printed items. The unique graphic may be referred to as a single printable file, a graphic, an impression, an image, or a 1 up. The unique graphic may comprise text, artwork, logos, information, raster art, and/or the like. A 1 up may be defined as one unique art or graphic file that consists of one or many colors and contains line art, vector art, raster art, images, and/or text. This 1 up file represents an entire order or a single line on an order or request. Therefore, throughout the disclosure the references to labels should be read broadly to include reference to any type of printed item (label or otherwise) within print jobs that are suitable for lane based roll type printing as described herein.

In an example embodiment, the printing is commercial printing. In another example embodiment, the printing is roll based or web based printing. In an example embodiment, the label printing of the present invention is not used in non-roll based printing. In an example embodiment, the label printing of the present invention is not used in printing single sheets of labels or business cards. In an example embodiment, the printing is lane-based printing. The lane-based printing comprises printing individual graphics on a roll of printable material.

In one example embodiment, the printing is label printing. In accordance with an example embodiment, the printing is digital printing. In one example embodiment, the digital printing may comprise a cylinder, wherein the laser writes an image to the cylinder to create a temporary image on the cylinder, which picks up color and transfers the color to the printable material. In another example embodiment, the digital printing does not involve physical cylinders. Rather, the label printing is printed digitally using one or more toner cartridges or stations, or one or more ink cartridges or stations. In these example embodiments, the digital toner or inkjet like stations may lay the color down on the printable material one color at a time or as one single shot. For example, the label printing system may comprise a digital cylinder type printer such as the Indigo™ printer provided by HP™, or a toner or inkjet type printer such as are provided by Xeikon™, Xerox™, Canon™, or any other digital printing press. Moreover, the press may be configured to work with the Cyan, Magenta, Yellow, Black ("CMYK") colors, or any other suitable number of colors, e.g., 5 colors, 6 colors, and fewer or greater numbers of colors.

In one example embodiment, the printing can be laid out with reference to a frame. Other example embodiments that do not involve a frame will be described herein as well. This frame convention is most appropriate in digital cylinder printing where the frame may have a size determined by the size of the cylinder. Moreover, whether the digital printing involves a cylinder or no, it should be understood that in example embodiments, the frame herein may have a size that is not related to the size of the cylinder.

In these example embodiments, the printing comprises more than one lane across a frame/drum or width of the printable material. The lane-based printing further comprises printing individual images (e.g., labels) in a lane where the lane crosses more than one frame. In an example embodiment, the lanes of labels are separated one lane from another, spliced end to end, and rolled to form a roll of labels (i.e., in a single line of labels).

For clarity, when discussing a frame herein, the frame comprises a width and a length. The width is the dimension of the frame that corresponds to the width of the printable material (across the roll). The width of the frame may also correspond to the direction/distance across the drum of the cylinder, if one is used. In an example embodiment, the frame width is 11.625 inches. Moreover, the frame width may be from 1 inch to 30 inches, and more preferably from 10 inches to 30 inches. Moreover, the frame width may be any suitable width.

The length of the frame is the dimension of the frame in the direction of the printable material as it comes off the roll to be fed into the printer. Though this length may be related to the distance around the cylinder, it may alternatively be set to be any suitable length. In an example embodiment, the frame length is approximately 17 inches. Moreover, the frame length may be from 3 inches to 44 inches, and more preferably from 4 inches to 44 inches. Moreover, the frame length may be any suitable length.

Figure 14:
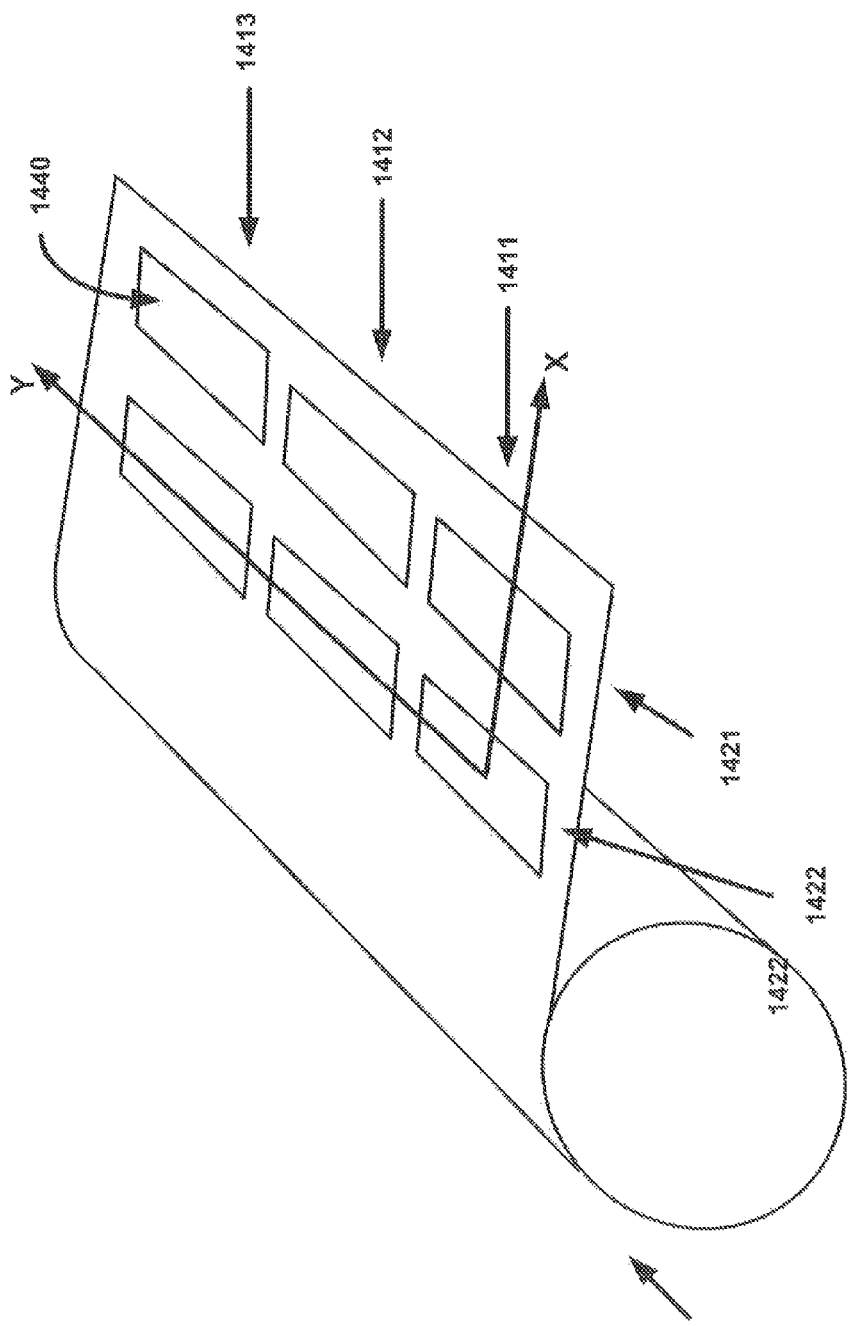
FIG. 14 is an example schematic drawing of a roll of printable material and a coordinate system for laying out 1 up files in accordance with an example embodiment.

In an example embodiment, and with reference to FIG. 14, a frame may comprise an array of 1 up's (1440 typ.). The frame may comprise more than one row (or lane) of 1 up's (e.g., 1411, 1412, 1413). The frame may also comprise at least one column of labels (e.g., 1421, 1422) laid out along or in parallel with a Y axis perpendicular to an X axis. Here, the X axis is in the length direction as the roll of printable material is unrolled, and the Y axis is in the direction across the width of the roll. This width is the width of the printable material itself and doesn't change as the roll is unwound. In one example embodiment, a lane is a row of 1 up's laid-out along or in parallel with the X axis. In another example embodiment, a frame comprises a two dimensional array of labels with more than one row and more than one column of individual graphics (e.g., labels). Each row may comprise part of a lane of labels. Thus, each row or lane may be oriented parallel with the length of the frame. Each column may be oriented parallel with the width of the frame.

As stated above, in various example embodiments, the printing of the present invention may be for use in connection with roll based printing involving more than one frame, wherein the lanes cross over more than one frame. In an example embodiment, the printing of the present invention is not used in single frame printing, meaning that the print job is not accomplished using a single frame of individual graphics that is repetitively printed to fulfill the entire print job. In an example embodiment, the frames comprise a plurality of consecutive frames that comprise a total number of frames greater than one. The plurality of consecutive frames may comprise W frames (where W is greater than one) such that a gang of label print jobs fills the W frames exactly or nearly exactly.

In another embodiment, the frame is larger or smaller than it would be for a cylinder. For example, the frame could be approximately the width of the roll of printable material and the length could be determined to be long enough to accommodate lane based printing of an entire gang of print jobs. In this embodiment, the total number of graphic items to be printed across the entire gang of print jobs can be divided by the number of lanes across the width of the roll of printable material. This result gives the number of graphic items to be printed in each lane. From this, and with any appropriate spacing between the graphic items to be printed, the length of the frame can be calculated. Thus, a single frame, or super frame, could accommodate the entire gang of print jobs.

As mentioned above, it is also possible to implement the system and method of printing disclosed herein without use of a frame. Accordingly, in an example embodiment, the system may determine how many columns and rows of 1 ups to use (where, for example, a first print job has a first number of times to print that 1 up, and a second print job has a second number of times to print a different 1 up). In an example embodiment, a printing system is configured to layout and ultimately print any number of 1 ups (each 1 up representing a unique print job) with the ability to print each 1 up a selected number of times for each print job. The system determines the total number of 1 up's to be printed across all the print jobs, determines the size of the 1 up's when printed, determines a permissible lane size and thus, determines the number of x/y locations.

The system lays out printing of copies of the first 1 up starting in a first lane printing the 1 up of a first job and then continuing laying out the 1 up of the second job after laying out the first number of the 1 up of the first job. If the end of the lane (i.e., the last column in a particular row) is reached and there are still more of the 1 up of that job to layout, the linear laying out of the 1 up of that particular print job is configured to continue in a different lane. This can continue, for example, until each print job has been laid out, one after the other, wrapping around to different lanes across the web of the printable material and along the length of the printable material just as far as needed to accommodate all of the 1 up's desired to be printed.

Figure 5:
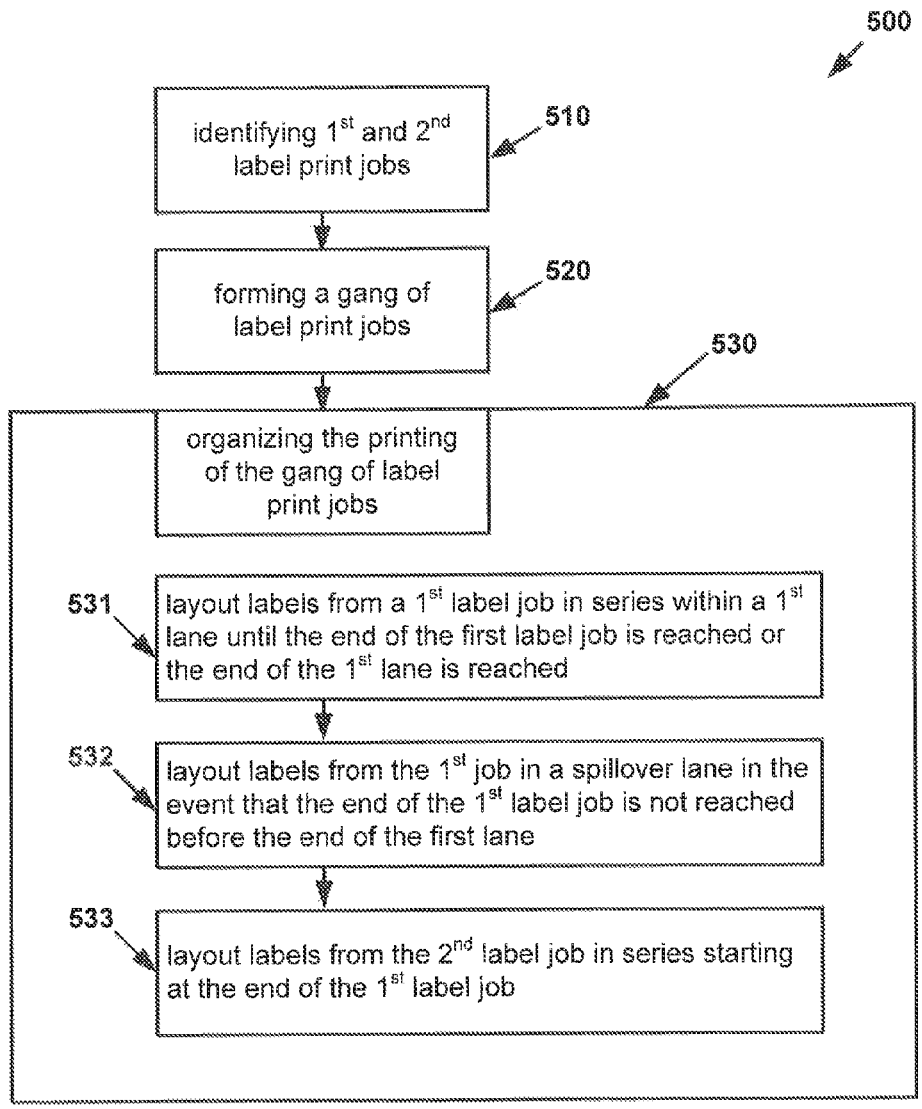
FIG. 5 is an example method of laying out a gang of print jobs in accordance with an example embodiment.

In accordance with an example embodiment, and with reference to FIG. 5, a method 500 of printing (e.g., printing labels) comprises identifying a first label print job and a second label print job (step 510). The first label print job differs from the second label print job. The difference between the first and second label print jobs may be due to at least one of the following differences: different customers, different purchase orders, different line numbers, different label graphics, different label text, different line art, and/or any other variable change from the previous file or graphic.

In accordance with an example embodiment, the number of labels in the first print job may be different from the number of labels in the second print job. In some example embodiments, the number of labels in one print job is different from the number of labels in at least one of the other print jobs. In yet another example embodiment, the number of labels in each print job is the same, for all print jobs in the gang of print jobs, and the number of print jobs is more or less than the number of lanes. In this last example embodiment, even with the same number of printed individual graphics (e.g., labels) in each print job, the difference between the number of print jobs and the number of lanes will result in print jobs wrapping into additional lanes. More generally, in example embodiments, at least one of the print jobs, in a gang of print jobs, is laid out and subsequently printed in less than or more than one lane. The print jobs are also laid out and subsequently printed "end to end." This means that they are laid out and subsequently printed in a manner to facilitate creating a roll of labels by slicing the lanes apart and splicing the end of one lane to the end of another lane. In this embodiment, all of the labels of a first job are lined up together. On the same roll, or a different roll, all of the labels of a second job are lined up together (if on the same roll, they are lined up before or after the labels of the first job).

Figure 13:
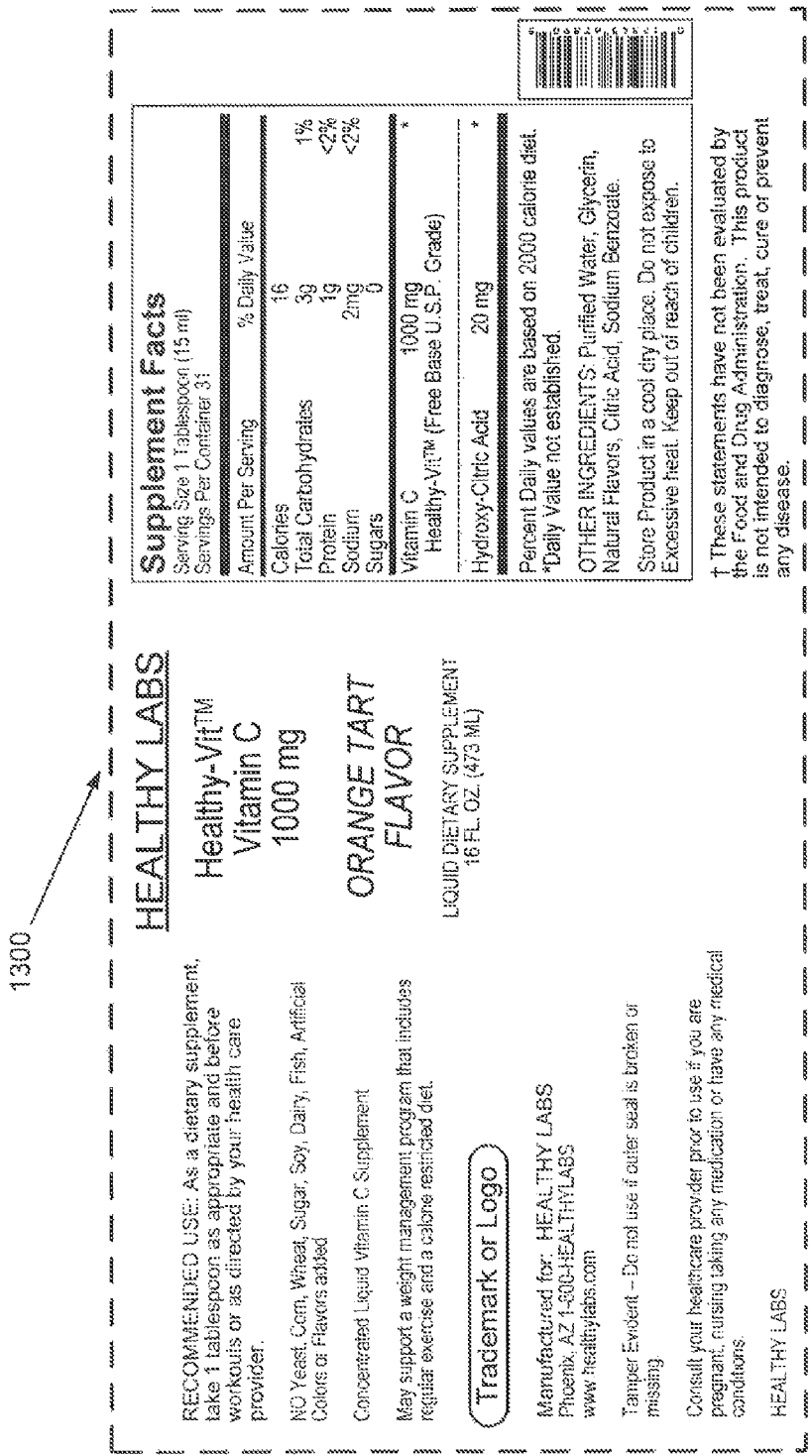
FIG. 13 is an example of a label, in accordance with an example embodiment.

In an example embodiment, a label may be any printable material, which can be affixed to an object, and on which is printed information, graphics, and/or the like. In an example embodiment, a label may be configured to be adhesively attached to a container. In other embodiments, the label may be configured for attaching to a bag, box, packaging, or directly to merchandize, etc. Any suitable method of attachment may be used. The label may provide information relevant to the labeled item (e.g., container and/or its contents). For example, and with reference to FIG. 13, a label 1300 may provide brand information, recommended use information, contents information, contact information, supplemental facts, bar codes, and/or the like. Label 1300 may thus comprise graphics, text, color, etc. Label 1300 may be electronically designed and saved electronically. The electronic representation of label 1300 may be referred to as an image, printable file, an individual graphic, an impression, a 1 up, and/or the like. In addition to product type labels (the "primary" label ordered), such as illustrated in FIG. 13, in accordance with various example embodiments, other labels may be printed including informational labels such as: invoice labels, start labels, shipping labels, end labels, quantity labels and/or the like.

Figure 6:
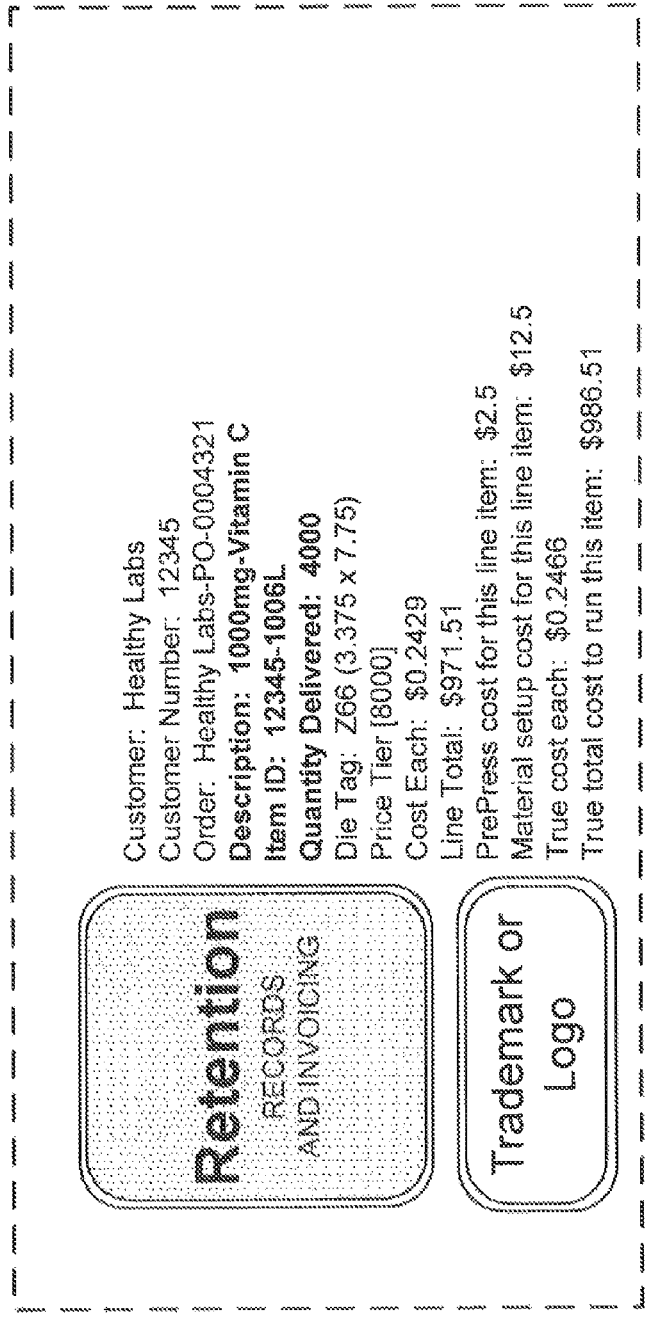
FIGS. 6-9 are example labels in accordance with an example embodiment.

Moreover, in an example embodiment, informational labels may be added within a print job, before a print job, between print jobs, or after a print job. These informational labels may comprise any label other than the primary label ordered. For example, informational labels may comprise an invoice label. FIG. 6 illustrates an example invoice label. An invoice label may comprise information useful for invoicing labels sold to a label customer. For example, the invoice label may set forth the customer, the customer number, the order identification number, the description of the label, the item identification number, the quantity of labels, pricing information for the labels, the shipping address, the source of the labels, bar code(s), trademarks, branding, and/or the like. In this example embodiment, the invoice label may be the first label or one of the first labels to come off the roll of labels. Moreover, the invoice label may be configured to be visible on the roll of labels when shipped and/or first opened. Therefore, the invoice label may be removed by the label customer and added to a records book. Moreover, the invoice label may be scanned upon receipt, scanned when moved internally, and/or scanned when the labels are about to be used. In an example embodiment, the bar code or a QR code, or 2D or 3 of 9 or any other scan-able code, may contain any of the above information. The invoice label can be used for billing such as an invoice that is used internally or given directly to the customer. The invoice label can stay with the roll of labels, or it can be provided to the customer separately. Other example invoice labels can comprise a credit card receipt for the purchaser's records, or a receipt for the payment by check or money order or any other form of payment.

Figure 7:
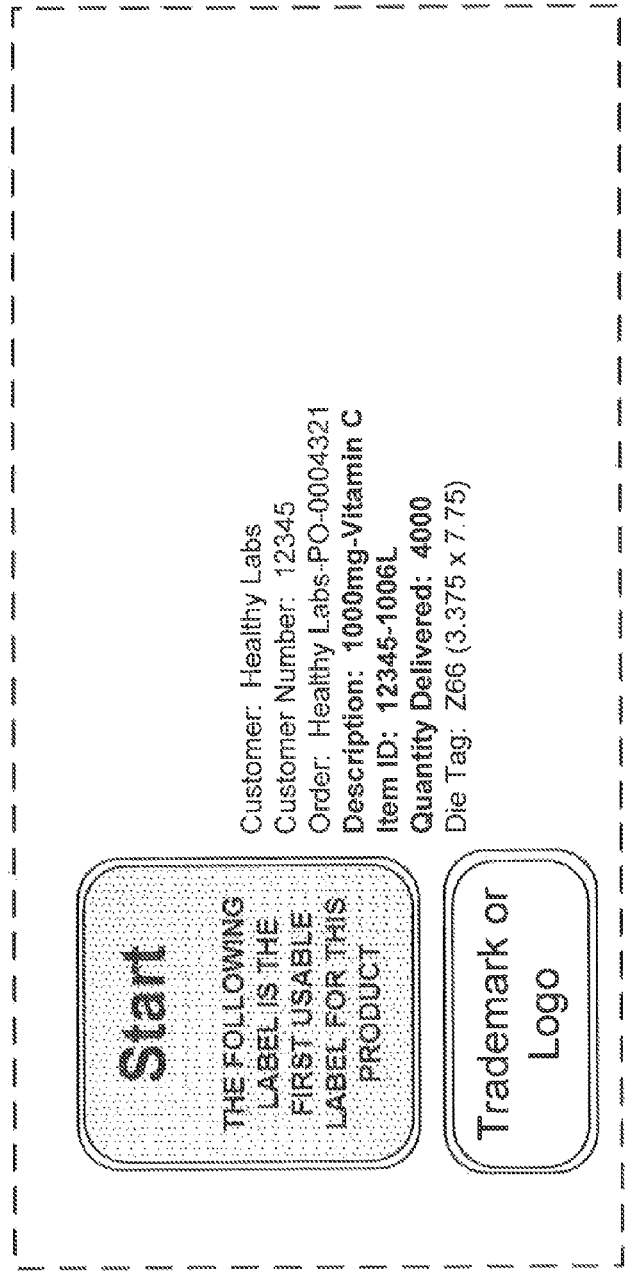

The informational labels may further comprise, in an example embodiment, a start label. The start label may be configured to indicate the start of a print job. FIG. 7 illustrates an example start label. For example, the start label may be configured to indicate that the labels immediately following the start label are the ordered labels. The start label may be located before the first label in a row of labels from a print job. The start label may have the word, "START" visible on the label, may have a computer readable indication identifying the start label as such, and/or may comprise symbolic and/or color representations that this is the start label. The start label may further include the customer name, number, order ID, quantity of labels and the like. Thus, the automated dispensing and/or application of labels from a roll of labels may be facilitated by virtue of a machine readable start label identifying when the start of a print job has been reached. Moreover, the use of a start label comprising visible indications may facilitate accuracy in application of labels and/or reduce human error.

Figure 8:
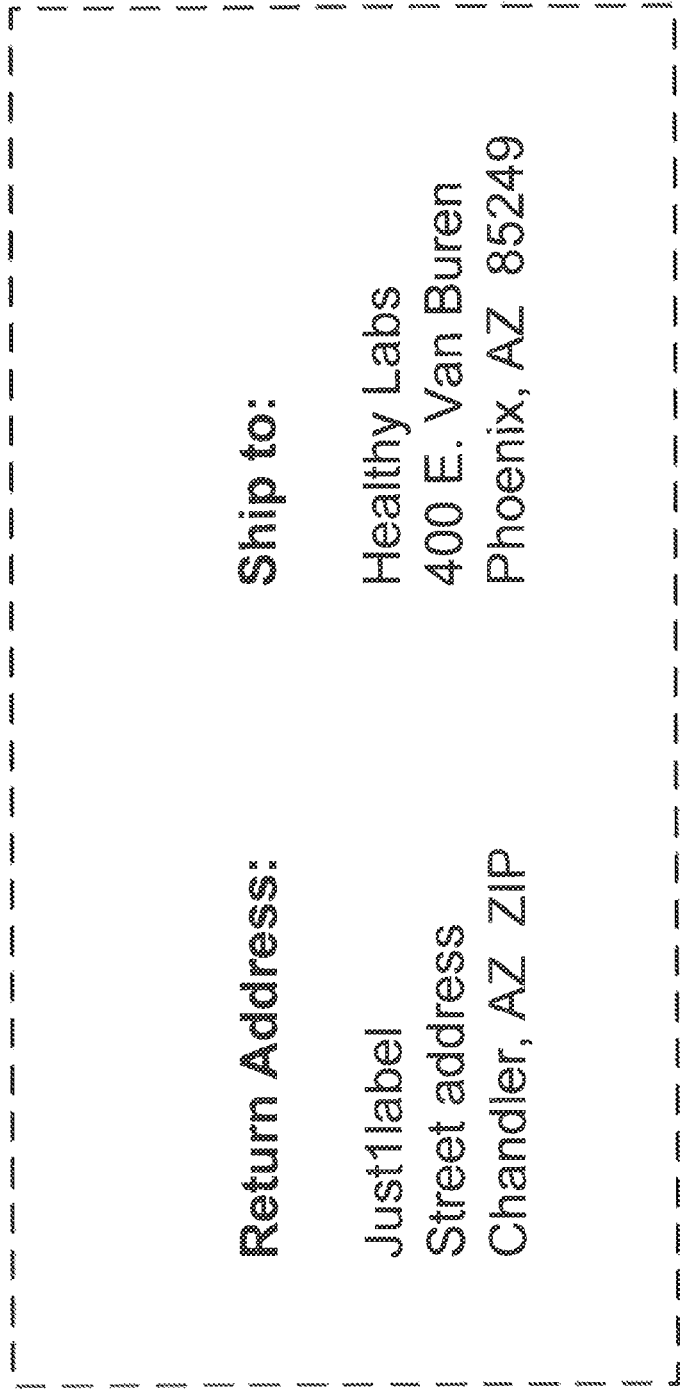

The informational labels may further comprise, in an example embodiment, a shipping label. FIG. 8 illustrates an example shipping label. The shipping label may comprise the name of the customer, the customer shipping address, the return address, special handling instructions, identification of the speed of delivery, identification of the carrier for the shipment, etc. The shipping label may be the first label off of the roll of labels. In another example embodiment, the shipping label may be one of the first labels off of the roll of labels. Thus, the shipping label may be configured for shipping the labels without separate shipping information being provided elsewhere on the shipment. In another example embodiment, the shipping label may be removed and placed on the packaging containing the labels to be shipped. Moreover, more than one shipping label may be provided where one comprises the return shipment information, one provides the customer address, and another provides handling instructions (such as "do not expose to extreme temperatures"). In another example embodiment, the "shipping label" can comprise information, such as a bar code, printed on the label, that facilitates scanning and performing tasks such as printing a shipping label for commercial or governmental postal/shipping/carrier service, such as in shipping labels printed for United Parcel Service, FEDEX, or the United States Postal Service. This barcode could also be used to identify the location of the label internally or at what stage of the process the job is at, for example moving the job from printing to finishing or from finishing to rewinding or rewinding to shipping or any other task.

The informational labels may further comprise, for example, a quantity label. The quantity label may identify the number of labels in the print job. In an example embodiment, the number of labels in a first print job may be X and the number of labels in a second print job may be Y, and X may be different than Y. Moreover, the quantity label may be located at or near the beginning or end of each print job.

Figure 9:
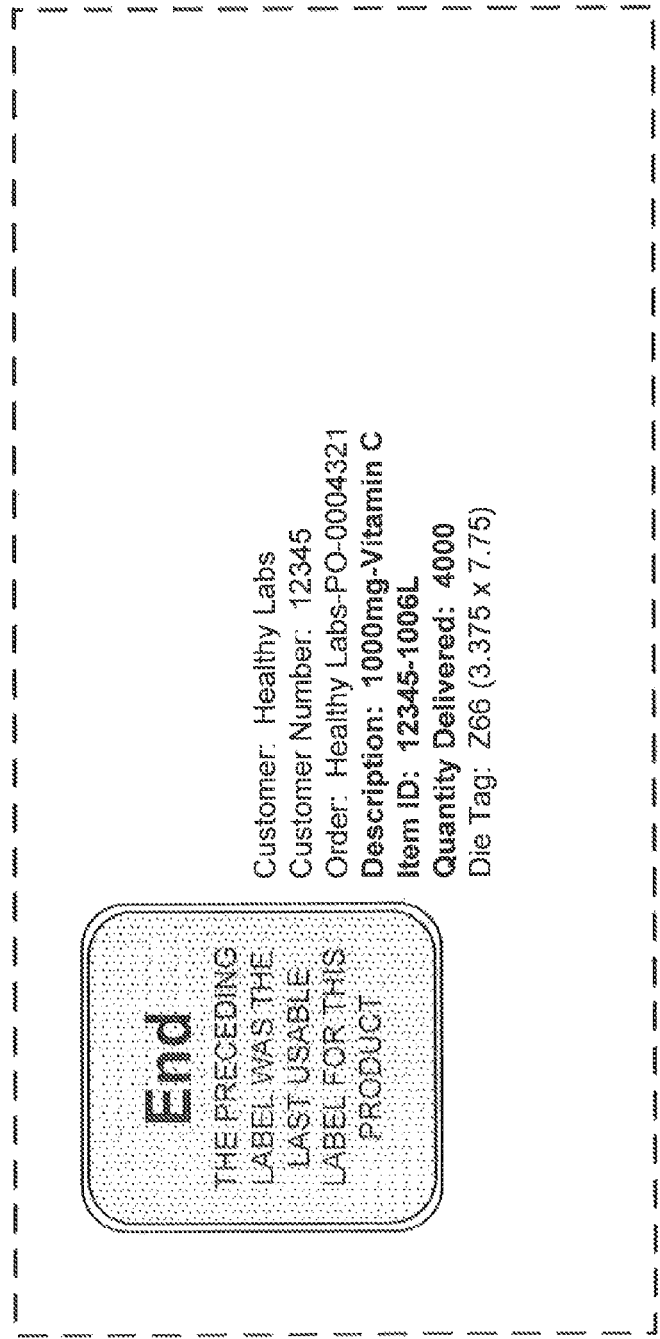

Moreover, the informational labels may further comprise, for example, an end label. FIG. 9 illustrates an example end label. The end label may be configured to indicate the end of a print job. The end label may be located after the last label in a row of labels from a print job. The end label may have the word, "END" visible on the label, may have a computer readable indication identifying the end label as such, and/or may comprise symbolic and/or color representations that this is the end label. The end label may further include the customer name, number, order ID, quantity of labels and the like. Thus, the automated dispensing and/or application of labels from a roll of labels may be facilitated by virtue of a machine readable end label identifying when the end of a print job has been reached. Moreover, the use of an end label comprising visible indications may facilitate accuracy in application of labels and/or reduce human error. In another example embodiment, the label roll itself indicates what product to label and how many products are to be labeled.

In an example embodiment, the informational label may further comprise at least one of: retention labels (see FIG. 6), coupon labels, job description labels, return merchandize authorization labels, receiving information labels, reseller or distributer branding labels, print cleaning graphic or an image to remove ghosting, registration marks, color bars or any other descriptor label that may be beneficial to the business or customer. Although these have been described in the context of labels, i.e., informational labels, it is intended that these printable items are equally applicable for print jobs other than label print jobs. Therefore, generically, informational 1 ups may be laid out and printed as described herein, such as: invoice 1 ups, start/end 1 ups, shipping 1 ups, quantity 1 ups, etc.

Thus, in an exemplary embodiment, the method 500 of printing labels may comprise printing a start label (start 1 up) at the beginning of each label print job. In addition or alternatively, the method of printing labels may comprise printing an end label (end 1 up) at the end of each label print job.

The method 500 of printing labels may further comprise printing informational labels between the first label print job and second label print job. In this example embodiment, the informational label may be considered an "intermediate label" or "intermediate indicator." The method of printing labels may further comprise printing informational labels as an initial part of the first label print job or second label print job. The method of printing labels may further comprise printing informational labels as a final part of the first label print job or second label print job. Moreover, in one example embodiment, the informational labels may be considered to be part of an individual print job. In another example embodiment, the informational labels may be considered to be outside of and appended to the individual print jobs.

Thus, the method of printing may comprise printing an inventory label (indicator) at the beginning or end of each print run. Moreover, the method of printing may comprise printing an information label (indicator) at the beginning or end of each print run, wherein the information label contains data relative to the job, inventory, and or the like.

In an example embodiment, the informational label may be adjustable information. By this it is intended that the informational label, in one example embodiment, can contain real time information. Real time information may comprise information that is added to the label at some point in time after the label layout has been finalized, but at least before the label is actually printed. Thus, last minute changes with respect to updated quantities, pricing changes, order numbers, product descriptions, time stamps and almost anything reportable can be updated before being sent to print.

In an example embodiment, blank or dummy labels can also be printed before and/or after the print run. The blank or dummy labels can be used for positioning of the label on a product or the set up of a machine that automatically affixes the labels to products. Such blank or dummy labels can be configured to provide an portion of the label roll for use in setting up the roll of labels on a labeling machine, for testing/qualifying, and or the like, without wasting actual labels ordered. Though any length of leading blank labels or trailing blank labels may be used, in an example embodiment, the length is 2 feet to 25 feet of labels. Such labels can be laid out on the array of labels similar to all the other 1 up jobs, as if such label were just another job among the print jobs described herein. Moreover, the blank or dummy labels can be used to pad lanes, in various circumstances, such as to push the next print job into a different lane where such will reduce the number of splices.

In an example embodiment, and with continued reference to FIG. 5, a method 500 of printing labels, wherein the labels comprise first and second print jobs, further comprises forming a gang of label print jobs comprising the first and second label print jobs (step 520). Thus, a gang of label print jobs may comprise two label print jobs, three label print jobs, up to any suitable number of label print jobs.

Stated another way, in an example embodiment, the method comprises qualifying a print job. In this example embodiment, qualifying the job further comprises grouping jobs together that involve similar features to form a gang of label print jobs. For example, the similar features may comprise one of: similar material types, material thickness, material quality, material finish, material laminate, varnishes, embossing, foil stamping, debossing, number of colors, and similar finished dimensions.

The method of printing labels may be used, for example, on labels or any print job that is printed using digital lane-based printing on printing material that is roll fed into the printing machine. The printing material in one example embodiment, is a 60# semi-gloss paper, estate paper, kraft paper, recycled paper, card stock, vellum, metalized paper or silver foil, holographic paper, cloth, tag material, clear polypropylene, metalized polypropylene, white polypropylene, vinyl, polyester, magnetic stock, or other printable materials. Furthermore, any suitable printing material may be used. Moreover, the labels or items being printed may have a size of about 1.875" by 4.5." In other example embodiments the labels may be from 0.125 to 30 inches by from 0.125 to 44" inches. Furthermore, in another example embodiment the labels may be as wide as the printable material width divided by two and as long as the total roll length divided by two. Moreover, the labels may be of any suitable size that still allows at least two lanes of labels to be printed in a single frame, or across the width of the printable material. In an example embodiment, the labels are approximately rectangular in shape. In other example embodiments, the labels are square, oval, circular, triangular, or any odd shape. Moreover, the label can be any suitable shape.

The method further comprises organizing the printing of the gang of print jobs across a plurality of consecutive frames, wherein the frames comprise at least two lanes, and wherein each lane runs across all of the plurality of consecutive frames (step 530). The method of printing labels thus comprises aggregated, lane-based, digital label printing. The printing is said to be aggregated because more than one print job is aggregated to form a gang of print jobs that is printed at the same time as the other print jobs in the gang of print jobs.

The method of printing labels may further comprise laying out labels from a label print job successively. Stated another way, the method may comprise laying out labels within a label print job sequentially. The method may further comprise laying out, in a two dimensional grid across multiple frames, labels from a first label job in series, sequentially within a starting lane until either the end of the first label job is reached, or the end of the starting lane is reached (step 531). The method may further comprise continuing to lay out labels from the first label job in a spillover lane in parallel with the starting lane in the event that the end of the first label job is not reached before the end of the starting lane (step 532). The method further comprises laying out labels from a second label job in series, sequentially starting at the end of the first label job (step 533).

Stated another way, in one example embodiment, the method may comprise laying out labels from the first label print job successively within a lane of said at least two lanes and starting in a first lane of the at least two lanes, wherein the laying out of labels from the first label print job continues in a second lane of the at least two lanes if: (a) the first lane is full, and (b) all labels from the first print job have not yet been laid out. The method may further comprise laying out labels from the second label print job successively within a lane of said at least two lanes and starting following the first label print job.

Thus, in one example embodiment, a label print job wraps around from a first lane to a second lane of the at least two lanes. In another example embodiment, a label print job spills-over into a second lane of the at least two lanes. In another example embodiment, a label print job cascades into a second lane of the at least two lanes. In another example embodiment, a label print job may start in one lane and end in another lane. In another example embodiment, a label print job may start in-between the beginning and end of one lane and end in-between the beginning and end of another lane.

With respect to the direction of the sequential printing of labels, in one example embodiment, the sequential printing is in the same direction for each lane. For example, the labels may be printed sequentially from left to right across a frame in a first lane, and then from left to right again in another lane. In another example embodiment, the sequential printing is in one direction for some lanes and in the opposite direction for other lanes. Thus, in an example embodiment, the direction of laying out the labels may zigzag as the labels are laid out to wrap around to other lanes.

Although described herein as wrapping around to the next closest lane, it should be understood that the sequential layout of labels may wrap around to any of the remaining lanes, as desired.

With momentary reference to FIG. 4, it is noted that the discussion herein is relevant to how the individual graphics within two or more print jobs are laid out and, after the gang of print jobs have been printed, the pattern of those individual graphics in the printed product. Nevertheless, the actual process of printing occurs as the printable material passes under the cylinder, ink jet print heads or drum. Thus, two or more labels in a column are printed at the same time. The labels may be from the same job or a different job, according to the predetermined layout of the print jobs. Thus, standard printing equipment can physically print using the same physical printer as before, but with vastly different, useful and efficient results by predetermining a layout of individual graphics to be printed in gangs of print jobs and driving the printing equipment according to that predetermined layout.

Figure 11:
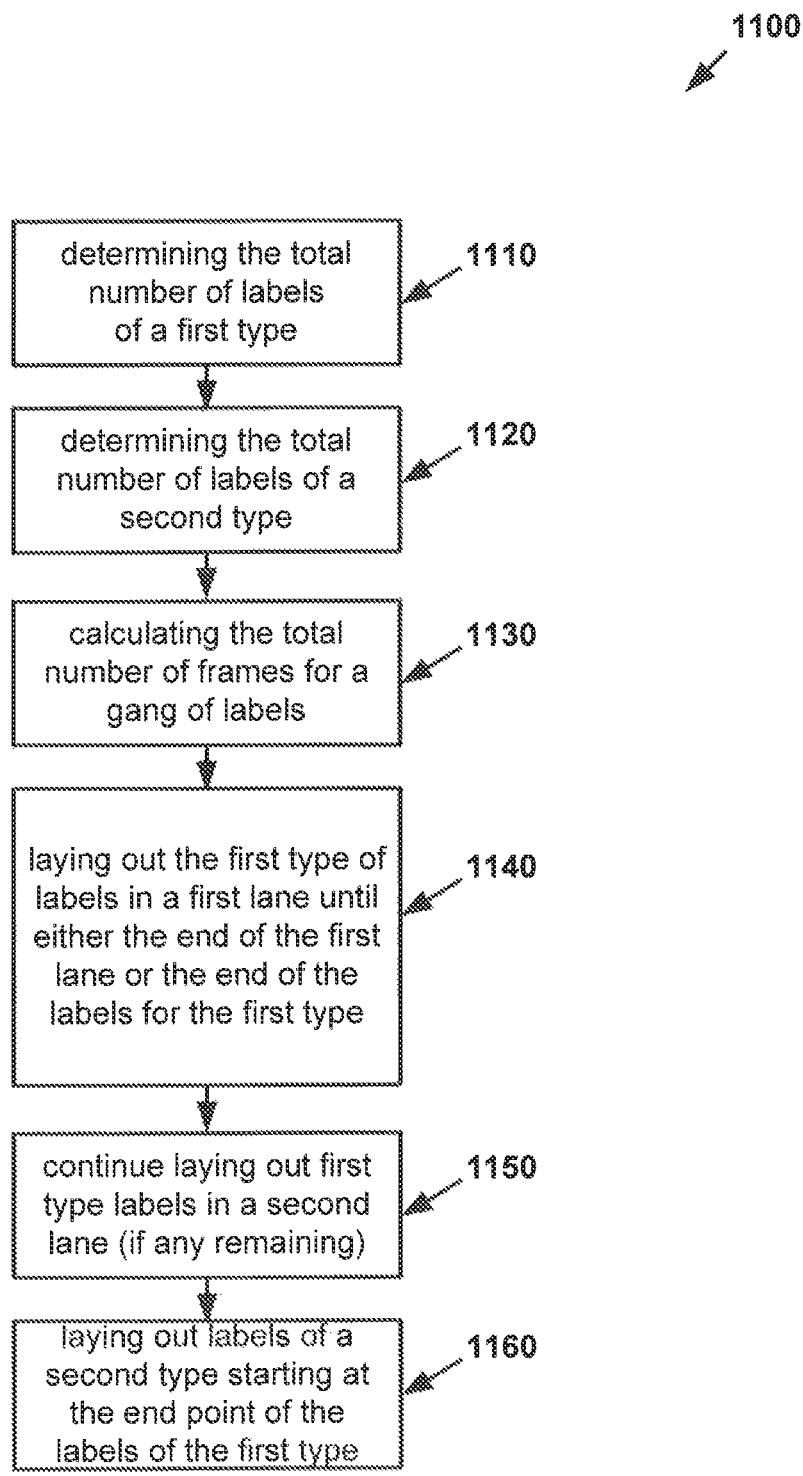
FIG. 11 is another example method of laying out a gang of print jobs in accordance with an example embodiment.

In accordance with another example, and with reference to FIG. 11, a method 1100 of laying out labels is provided. The method of laying out labels may comprise determining the total number of labels desired to be printed of a first type that form a first print job (step 1110). The method may further comprise determining the total number of labels desired to be printed of a second type that form a second print job (step 1120). The method may further comprise calculating the total number of frames for a gang of labels comprising the first and second print jobs (step 1130). This may be done, for example, by adding the total number of labels desired from the print jobs that are to be ganged together and dividing by the total number of labels that may fit in one frame. For example, in a scenario where three print jobs are desired, where the total number of labels for the first print job is A, the total number of labels for the second print job is B, the total number of labels for a third print job is C, and each frame can hold D labels, the total number of frames T for the gang of labels comprising the first, second and third print jobs may be calculated as $T=(A+B+C)/D$. It is noted that, where T is an integer, the A+B+C labels will exactly fill the T frames. Where T is not an exact integer, the total number of frames may be rounded up to the next integer and the A+B+C labels will not completely fill all the frames. For example, there may be a few labels in the final lane that have blank labels. In other examples, the non-used spaces for labels may be laid out in any suitable manner, such as between jobs, at the start or end of jobs, and/or the like. In an example embodiment, blank or dummy labels may be added to adjust the final position of cut labels inside of a print job. Thus, the system may be configured to add a blank label or two to fill out a lane, rather than start a new job relatively close to the end of a lane. This facilitates the elimination of an additional cut and splice, and facilitates a more efficient processing of the printed labels.

In this regard, each splice adds time to the processing of label orders. Thus, in an example embodiment, the number of splices used may be minimized. The print jobs may, in an example embodiment, be organized within a "SUPER FRAME" to minimize the number of total splices needed to complete all aggregated print jobs. For example, the method can comprise the steps of calculating the total number of labels across all orders to be printed at one time, then dividing the total number by the maximum number of lanes (e.g., lane 1 (L1), lane 2 (L2), etc.) across the frame to calculate the maximum number of labels per lane (Lmax). Next, the aggreagated print jobs can be sorted by quanitity from the largest print job to the smallest print job (e.g., Q1>Q2>Q3>Q4>Q5, etc.). Then the quantity of labels of the largest print job can be compared to the maximum number of labels and if Q1 is less than or equal to Lmax for L1, then lane 1 is filled with the Q1 job starting from the beginning of the lane. Next, if Q2 is less than or equal to the remaining portion of Lmax for lane one, then the Q2 job is added to lane one. This can continue until the remaining space on L1 is less than the next quantity of labels for the next largest a print job. In that event, then the method begins filling L2 using the same procedure. This continues through the last available print lane. The method can further comprise going back to lane one and checking to see if further smaller print jobs can fit in the remaining portion of Lmax for that lane. If not each subsequent lane can be checked. This can continue for the remaining jobs until all the jobs that will fit in the Super Frame have been laid out. If stopped here, the number of splices can be zero, but with likely some wasted labels. In an example embodiment, the last jobs may be added to fill in the remaining empty spaces at the end of two or more lanes giving rise to one or more splices. Nevertheless, the approach describe herein reduces the number of splices on most jobs to zero. In yet another different approach, the total number of columns can be adjusted plus or minus a couple columns to reduce the number of splices and/or blank labels can be used for the same purpose.

In a further different example embodiment, the jobs may be laid out in sequence end to end or grouped (for a single customer/shipping address, or other common reason). In this manner, it is possible to most easily and with the minimum number of splices to create a single roll for that group. Thus, the lay out of the labels can be configured to reduce the number of splices per group of print jobs (subset that are to be on a single roll).

The method may further comprise laying out the first type of labels consecutively in a first lane, wherein the first lane runs across all of the frames, from a start point until either the end of the first lane is reached or the end of the number of labels is reached for the first type. (step 1140). Furthermore, the method may comprise continuing laying out the first type of labels consecutively in a second lane if the end of the number of labels for the first type is not reached in the first lane (step 1150). The method may further comprise laying out labels consecutively of the second type starting at the end point of the labels of the first type (step 1160).

In an example embodiment, the plurality of consecutive frames comprises a total number of frames greater than one, and the method further comprises calculating the total number of frames such that the gang of label print jobs exactly fills the frames. Moreover, the method may comprise calculating the total number of frames such that the gang of label print jobs approximately fills the frames. By approximately, it is intended that the number of frames is selected such that no more than N-1 labels are overage/scrap when N equals the total number of labels that can be printed in a single frame.

In an example embodiment, the method comprises determining which print jobs can fit within a gang of print jobs. By this it is meant that it may be the case that the length of the printing material may be limited based on criteria selected by the operator. In one example embodiment, the print operator may want to limit the print run to a specific amount of material for handling purposes on the rewind side, or the operator may want to print for a specific amount of time due to work shift length. Therefore the method comprises, determining the maximum number of frames available within the predetermined limited length of printing material. The maximum number of labels that can be printed within that length (and possibly the number of frames) may be based on one or more of: the label request, the specifications of the label machine, the linear footage of the printer output roll, the spacing between labels, the press specifications. The method may further comprise comparing the maximum number of frames available within the predetermined length of printable material with the number of frames calculated to complete the gang of print jobs. If the maximum available frames is exceeded by the frames for the gang of print jobs, the method may eliminate a print job from the gang of print jobs or replace it with a smaller print job. The method may then recalculate to confirm that the gang of print jobs will fit within the predetermined length.

Figure 12:
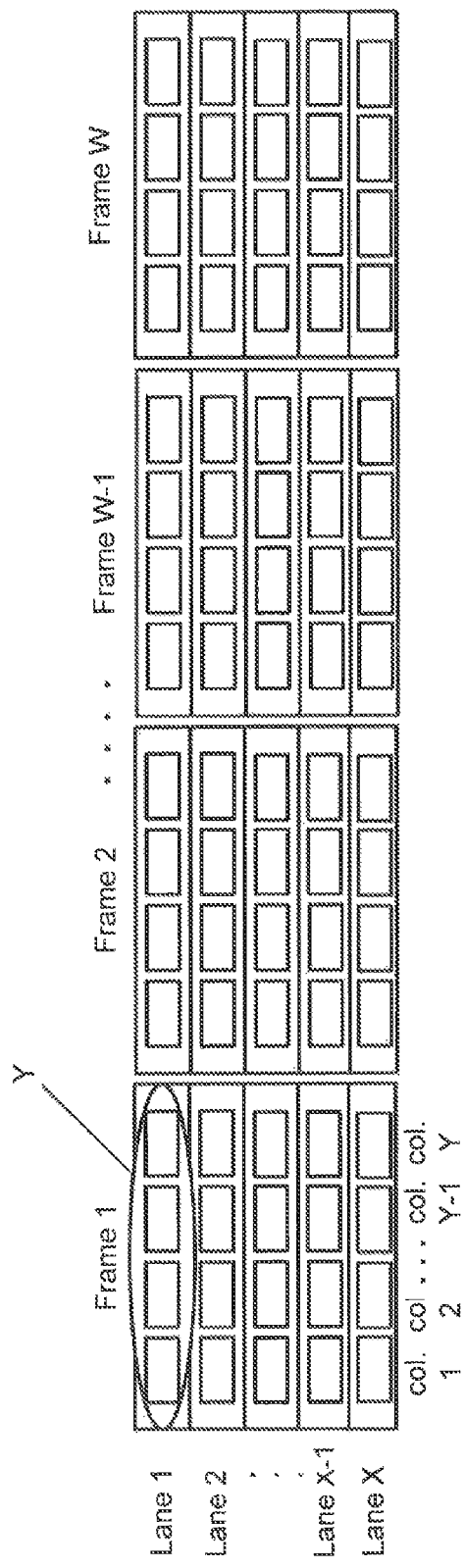
FIG. 12 is an example schematic diagram illustrating the printing of two print jobs in accordance with an example embodiment.

With reference now to FIG. 12, a method of calculating and laying out a gang of print jobs comprising a first label print job and a second label print job, is provided. In an example embodiment, a computer is configured to perform the calculations described herein and to assist with laying out the gang of print jobs. In this method a total of T labels are laid out, wherein T=U labels of a first label print job+V labels of a second label print job. Again as described herein, the labels of the first print job may differ from the labels of the second print job. In an example embodiment, the T labels are printed in X lanes, where X is greater than one. Z may equal the total number of labels in a single lane. Z may be calculated by dividing T by X and rounding up to the next whole integer. In this example, the method may comprise printing labels from the first label print job successively in a first lane of the X lanes and wrapping into a successive lane if U>Z. The method may further comprise printing labels from the second label print job successively in one of the X lanes picking up where the printing of the U labels of the first label print job left off.

In another example embodiment, W is the total number of frames over which the T labels are printed, wherein W>1, wherein Y=the total number of labels in a single lane of a single frame, wherein W=T/(X*Y) rounded up to the next integer. The total number of labels in a single lane of a single frame is Y. In this example, a method comprises printing labels from the first label print job successively in a first lane of the X lanes and wrapping into a successive lane if U>Y*X; and printing labels from the second label print job following after the printing of the U labels of the first label print job.

In this embodiment, the number of lanes X may be determined by the width of the printable material roll, the height of the label (i.e., in the direction across the material), the space between the labels and the space at the edge of the printable material. In this embodiment, the number of columns Y in a frame may be calculated based on the length of a frame, the width of the label (i.e., perpendicular to the height of the label, the space between the labels in the lanes, and the space at the edges of the frame.

In an example embodiment, the labels are printed over the W frames with zero overage from the original order. In another example embodiment, the labels printed over the W frames have an overage no greater than (X*Y)−1. In another example embodiment, the labels printed over the W frames have an overage less than one frame of labels.

In accordance with various embodiments, the method further comprises slicing the first lane apart from the second lane across multiple frames. The method may further comprise splicing the first lane onto the end of the second lane, and rolling up the spliced labels to form a roll of labels that is a gang of labels all in a single row with the first label job coming off the roll of labels before the second label job comes off, or vice versa.

In an example embodiment, after printing and cutting the next step can be merging the lanes to create the minimum amount of rolls. One example way of determining the minimum amount of rolls possible is by calculating the outside diameter based on how many labels were ordered and the length of an individually printed image. A popular maximum outside diameter for a finished roll may be 14," though any size may be used as the maximum outside diameter. If the calculated outside diameter of all merged rolls is less than 14" then the job may be rewound or rewound and spliced together and delivered as a single roll. If the outside diameter is larger than 14" then the program may divide the requested quantity one or more times until the outside diameter of each subsequent roll is at or below the maximum of 14." The result may be one or more final rolls.

To further the example the program may also add extra informational rolls at the beginning and/or end of each new roll that is requested from the division. Each roll could possibly have its own 'start', information, and/or End label. Each roll could also list the total quantity on the order as well as the quantity on the roll after the print job was divided. Each roll's information label may also call out the number of rolls that the job was divided into as well as identify the number of the current roll. For example, the informational label may say Roll 1 of 3 on the first roll, Roll 2 of 3 on the second roll, and Roll 3 of 3 on the third roll. This same example above may be controlled by the request of a maximum number of labels per roll. The rolls may instead be divided at specific quantities requested. For example, the requested quantity per roll may be 2000 labels. On a 10,000 quantity run the program could divide the number of rolls by 2000 and the final output would be 5 rolls of 2000.

Figure 10:
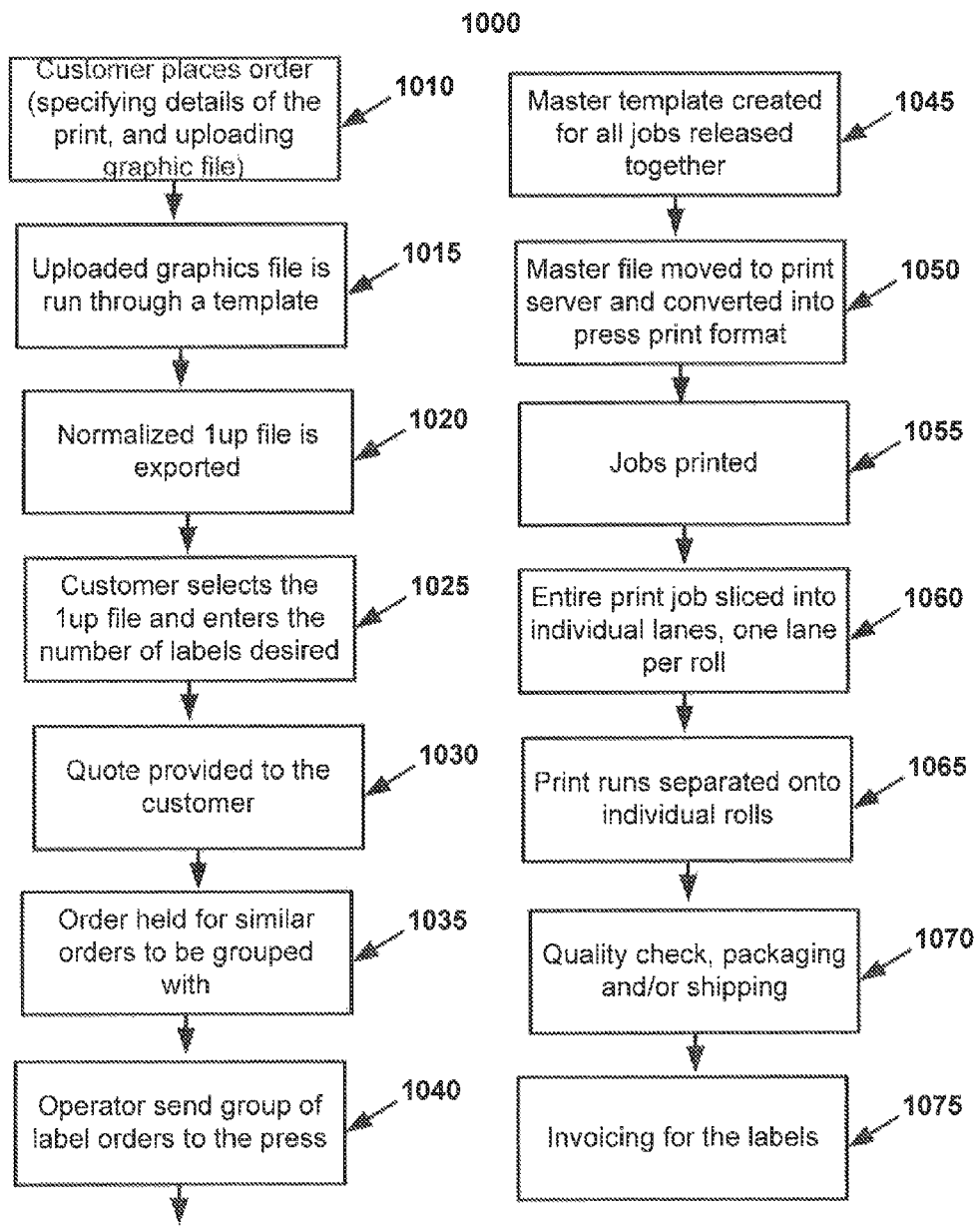
FIG. 10 is an example label ordering and fulfillment method in accordance with an example embodiment.

With reference now to FIG. 10, a example method 1000 is now described in the context of an example system for implementing the disclosure herein. A customer can place an order (step 1010) for 1 or more labels of 1 or more products. The customer can place the order over the phone with an employee who may enter the order electronically. Alternatively, the customer can use a consumer terminal, such as, a Mac or PC or Linux or any other type of computer, tablet, phone or peripheral with a browser to places an order. The user may interface, for example, over the internet thru a website located on a web server.

The customer can specify the die size, description of the material, finish, etc. The products ordered by the customer may be similar or different material, finishes, or dimensions. The customer may upload or e-mail or deliver a graphics file, showing the desired label, electronically which once uploaded can be stored on the network located either locally, or off site. Thus, the system may comprise one or more databases or network storage. The uploaded file can be assigned a description and all pertinent information by the customer such as dimensions, requested print material, requested finishes, etc. can be stored. This information can be stored in a centralized database which may be located locally or off site. The file once uploaded can be normalized (step 1015) by running thru a template that corresponds to the dimensions selected by the customer. In an example embodiment, the file can then be exported (step 1020) from this process into a standard file format that can be understood by whatever format is needed by the printing press (this may include PDF, Illustrator, Photoshop, or any other format that may be used by the printing press).

Once the file is uploaded and normalized the customer can then select (step 1025) the graphics or 1 up files that they would like to print using their browser and internet connection and provide a requested quantity for each individual graphic or 1 up file. The customer can be given an instant quote (step 1030) and accept the pricing.

In an example embodiment, the system can put the requested order for that specific order into a holding status (step 1035) for a specific amount of time which may be less than or greater than 1 day, 5 days, 10 days, or any suitable time period. Over time, that single job may be the only print request that matches certain similar criteria in order to run on the press such as printable material type, finished dimensions, and finishes such as coatings or over laminates, or there may be more than 1 print request that matches that job. If there is 1 or more similar jobs the program or press operator may release these jobs to press, together, in order to reduce the cost for the business itself or the customers or both (step 1040).

The graphics can be loaded into a master template (step 1045) that specifies the total amount of x and y coordinates to complete all requested quantities that have been grouped as a single print run. This master print file may contain one or many graphics across one or many orders representing one or many customers. This master file can be moved to the print server where it can be converted into a format that the press can use to print (step 1050). The press operator can then print the entire group as one print run (step 1055) and deliver the print in a roll to the finishing process. The entire press job can then be cut and sliced into individual lanes on individual rolls that contain all graphics across all orders across all customers that were grouped (step 1060). These rolls can then be brought to a machine that can separate each of these print runs onto individual rolls into the original individual requested quantities (step 1065). In an example embodiment, a quality check can be made to ensure that there are no defects. The rolls of labels can be separated, packaged, and shipped to the individual customers (step 1070). The customer can then be, in an example embodiment, invoiced and the individual line on that order for that customer is closed (step 1075).

In some example embodiments (e.g., Indigo press), the server provides a text file to the press, which uses its internal programming to process the text file to print a single frame, and then provides the next text file to the press to print the next frame. Thus, by providing sequential text files, the printer can be forced to print the lanes as laid out with jobs end to end/wrapped as described herein. In another example embodiment, the entire layout is created using any suitable web publishing software (MS Word, etc.) and the entire layout is sent to the press. In the former, the printer uses the text file and 1 ups to properly locate the 1 ups. In the latter, the printer merely prints the entire master frame.

In an example embodiment, a roll of labels may comprise a plurality of labels of a first type and a plurality of labels of a second type. The plurality of labels of the first type are at least partially located on a first strip of material-backing (e.g., paper backing, transport, or liner). In some example embodiments, the printable material has no material-backing; i.e., the printing is done directly on the printable material. The plurality of labels of the first type may be located next to one another. The plurality of labels of the second type are at least partially located on the second strip of material-backing. The plurality of labels of the second type may be located next to one another. In an example embodiment, one of (a) at least some of the plurality of labels of the first type are located on the second strip of material-backing, and (b) at least some of the plurality of labels of the second type are located on the first strip of material-backing. In this embodiment, the first strip of material-backing is spliced with the second strip of material-backing. Moreover, the first type of label is different from the second type of label. In addition, the splicing is not necessarily coincident with the division between the first type and the second type. Moreover, the labels may comprise a start and an end label. In an example embodiment, the first type of label may be preceded or followed by an inventory label, and/or a shipping label.

In an exemplary embodiment, the label printing system may be configured to form a gang of print jobs for the same product, but where a first print job differs from the second print job. The first and second print jobs may be part of the gang of print jobs, and as discussed before, the print jobs may differ for any number of reasons. For example, the print jobs may have different art work or belong to different clients. Nevertheless, in the embodiment where the same product is contained in the same container, it is convenient to form a gang of print jobs where they various print jobs of that gang of print jobs are related at least in that they are destined to label that container/product. This method may similarly be performed with minimal label overage.

In another example embodiment, a method is provided for creating end to end label batches on a single run of a multi-lane multi frame digital label printer.

An exemplary label product may comprise a plurality of labels of a first design located in a row on a roll of labels, where the plurality of labels of the first design are followed by a plurality of labels of a second design that are also located on the roll of labels. The roll of labels may be created by splicing first and second label backing portions together, where the first label backing portion is from a first lane and the second label backing portion is from a second lane. The first and second lanes may be configured to cut across multiple frames of a roll printing of labels.

In an example embodiment, a method of lane based, roll based label printing comprises the steps of laying out labels in at least two lanes from at least two label print jobs, wherein the at least two label print jobs are laid out end to end and wrapping into successive ones of the at least two lanes, and printing labels in columns across those at least two lanes in accordance with the label layout predetermined in the step of laying out labels.

The system for laying out labels described herein can further facilitate the ability for a customer to obtain discounts for print jobs that are too small to normally be entitled to a volume discount. In an example embodiment, the system is configured to facilitate a print job customer to "jump on" the print job of another, unrelated print job customer. In an example embodiment, a first customer may request a first job and a second customer may request a second job. The first and/or second customer's jobs may each be for a number of labels less than a threshold amount that would qualify one and/or the other to receive a volume discount. The system may be configured, however, to compare the print job requests and gang together separate requests that are compatible for printing in a gang of print jobs.

In one embodiment, this comparison and ganging of print jobs may occur without notice to the customers. In this embodiment, this method may simply provide efficiencies for the print business, or the print business could pass on savings to its customer by invoicing them with a courtesy discount.

In another example embodiment, however, the customer can be informed at the time an order is placed that the order will not be released to press for a period of time (e.g., 10 days or 5 days, or any suitable time period) and that the customer may get volume discounts if other customers jump on their order during this time period to form a gang of print jobs sufficiently large to obtain a particular level of volume discount. It is noted that there could be several thresholds of volume discounts. Moreover, subsequent customers may be informed of pending orders and encouraged to "jump on" those orders before the expiration of a particular time frame. As subsequent customers submit compatible orders, the original customer and subsequent customer may all be informed of the size of the ganged order and of discounts they may now be eligible to receive. Thus, any customer placing an order may be guaranteed a specific price, with the possibility of a lower price.

In another example embodiment, a customer can place an order but provide that the order shall not be printed until a sufficient gang of print jobs is assembled to merit a particular discount level. At the other extreme, a customer may elect to have the job released to press right away and forgo any possible lower price. The discounts may be monetary, free shipping, credits for future print jobs, and/or the like. These communications between the customer and the system may take place via a web interface and the internet, via phone, or any other suitable manner.

The present invention may be described herein in terms of functional block components, screen shots, optional selections, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot), tablet, cellular phone, smart phone, and/or the like. Similarly, the invention could be used in conjunction with any type of personal computer, network computer, workstation, minicomputer, mainframe, or the like running any operating system such as any version of, DOS, Windows, Windows NT, Windows 2000, Windows 98, Windows 95, Windows 7, Windows 8, MacOS, OS/2, BeOS, Linux, UNIX, or the like. Moreover, although the invention may be implemented with TCP/IP communications protocols, it will be readily understood that the invention could also be implemented using IPX, Appletalk, IP-6, NetBIOS, OSI, or any number of existing or future protocols.

The system may have a computing unit implemented in the form of a computer-server, although other implementations are possible, such as a main frame computer. However, the system may be implemented in other forms, such as a minicomputer, a PC server, a network set of computers, and/or the like.

In an exemplary implementation, the system is implemented as computer software modules loaded onto the system computer or in a cloud environment or off site server.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is essential to the practice of the invention unless specifically described herein as "critical" or "essential."

What is claimed is:

1. A method of aggregated, lane-based, digital label printing, the method comprising the steps of:
   qualifying a gang of print jobs, wherein qualifying the gang of print jobs further comprises grouping print jobs together that involve similar features to form a gang of print jobs; wherein the similar features comprise one of similar label printing materials, colors, images, text, and line art dimensions; wherein the gang of print jobs comprises at least a first label print job and a second label print job;
   determining the maximum number of labels to be printed in the gang of print jobs and maximum number of lanes in which to print the gang of print jobs, wherein determining the maximum number of labels and lanes is based on one or more of: the number, size, and spacing between labels in the gang of print jobs, the width of a roll of printable material, and operator input;
   laying out, in a two dimensional grid, labels from the first label print job, in series, sequentially within a starting lane until either the end of the first label print job is reached, or the end of the starting lane is reached;
   continuing to lay out labels from the first label print job in a spillover lane, in parallel with the starting lane, in the event that the end of the first label print job is not reached before the end of the starting lane;
   laying out labels from the second label print job, in series, sequentially starting at the end of the first label print job;
   wherein the two dimensional grid is formed of at least two lanes (including the starting lane and spillover lane) and at least two columns, and wherein the number of columns is determined by dividing the maximum number of labels by the maximum number of lanes, and rounding up;

providing the layout of labels of the first and second label print jobs to a printer;

printing the first and second label print jobs according to the layout of labels provided to the printer, wherein the printing is in lanes on a roll of printable material;

slicing the starting lane apart from the spillover lane across all of the columns; and splicing the starting lane onto one end of the spillover lane to form a roll of labels that is a gang of labels all in a single row with the first label print job coming off the roll of labels before the second label print job comes off.

2. The method of claim 1, further comprising including at least one informational label in the gang of print jobs, wherein determining the maximum number of labels and lanes is further based on the number of informational labels.

3. The method of claim 2, wherein the roll of labels comprises within the first label print job the informational labels, and wherein the informational labels comprise at least one of: a start label, an end label, an invoice label, and a shipping label; and wherein the total number of labels from the first label print job is different from the total number of labels from the second label print job.

4. The method of claim 2, further comprising laying out a start label at the beginning of each label print job, and laying out an end label at the end of each label print job.

* * * * *